United States Patent
Lee et al.

(10) Patent No.: US 7,116,607 B2
(45) Date of Patent: Oct. 3, 2006

(54) APPARATUS AND METHOD OF REMOVING DISTURBANCES DURING OPTICAL RECORDING AND/OR REPRODUCING

(75) Inventors: Moon-noh Lee, Gyeonggi-do (KR); Won Kim, Gyeonggi-do (KR); Gwang-ho Lee, Gyeonggi-do (KR); Sung-ro Go, Gyeonggi-do (KR); Hong-rok Kim, Gyeonggi-do (KR); Il-hong Suh, Seoul (KR); Wan-kyun Chung, Gyeongsangbuk-do (KR); Young-jin Choi, Gyeongsangbuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 10/232,826

(22) Filed: Sep. 3, 2002

(65) Prior Publication Data

US 2003/0058753 A1     Mar. 27, 2003

(30) Foreign Application Priority Data

Sep. 3, 2001  (KR) ........................... 2001-0053847

(51) Int. Cl.
G11B 21/08 (2006.01)
(52) U.S. Cl. ................ 369/30.16; 369/30.11; 369/30.17
(58) Field of Classification Search ............ 369/30.16, 369/30.15, 30.17, 44.28, 44.25, 44.27, 44.32, 369/53.28; 380/77.04, 77.08, 77.05
See application file for complete search history.

(56) References Cited

U.S. PATENT DOCUMENTS

| | | | | |
|---|---|---|---|---|
| 4,594,622 A | | 6/1986 | Wallis | |
| 4,835,754 A | * | 5/1989 | Yamamoto et al. | 369/44.28 |
| 5,090,001 A | * | 2/1992 | Ito et al. | 369/30.17 |
| 5,117,410 A | * | 5/1992 | Akiyama | 369/44.25 |
| 5,351,222 A | * | 9/1994 | Ikeda et al. | 369/30.17 |
| 5,581,521 A | * | 12/1996 | Nomura et al. | 369/44.35 |
| 5,604,722 A | * | 2/1997 | Suzuki | 369/30.15 |
| 5,608,586 A | | 3/1997 | Sri-Jayantha et al. | |
| 5,757,747 A | * | 5/1998 | Shimada | 369/44.28 |
| 5,892,742 A | * | 4/1999 | Yamashita et al. | 369/44.27 |
| 6,606,283 B1 | * | 8/2003 | Chan | 369/30.15 |
| 6,721,247 B1 | * | 4/2004 | Watanabe | 369/44.34 |
| 6,906,986 B1 | * | 6/2005 | Lee et al. | 369/44.36 |
| 2002/0024899 A1 | | 2/2002 | Cho et al. | |
| 2002/0118618 A1 | * | 8/2002 | Cho et al. | 369/30.16 |
| 2003/0048717 A1 | * | 3/2003 | Lee et al. | 369/53.18 |

FOREIGN PATENT DOCUMENTS

| | | |
|---|---|---|
| EP | 1 182 652 | 2/2002 |
| GB | 1 486 121 | 3/1975 |

(Continued)

*Primary Examiner*—Tan Dinh
(74) *Attorney, Agent, or Firm*—Staas & Halsey LLP

(57) ABSTRACT

An apparatus to remove periodic disturbances in a recording medium having large eccentricity and deflection mass includes an actuator to change a position of a pickup in response to a combination of first and second compensation signals, an error detector to detect an error between positions actuator and the recording medium, a first compensator to receive the detected error and to output the first compensation signal that the actuator uses to actuate the pickup along the recording medium in upper and lower directions, and right and left directions; and a second compensator to output the second compensation signal from which the disturbance has been removed, to combine the compensated error and previous first and second compensation signals, and to filter the combined result at a predetermined bandwidth.

44 Claims, 6 Drawing Sheets

FOREIGN PATENT DOCUMENTS

| | | |
|---|---|---|
| GB | 2 158 611 | 11/1985 |
| JP | 01-204281 | 8/1989 |
| JP | 11-203702 | 7/1999 |
| JP | 2000-357337 | 12/2000 |

* cited by examiner

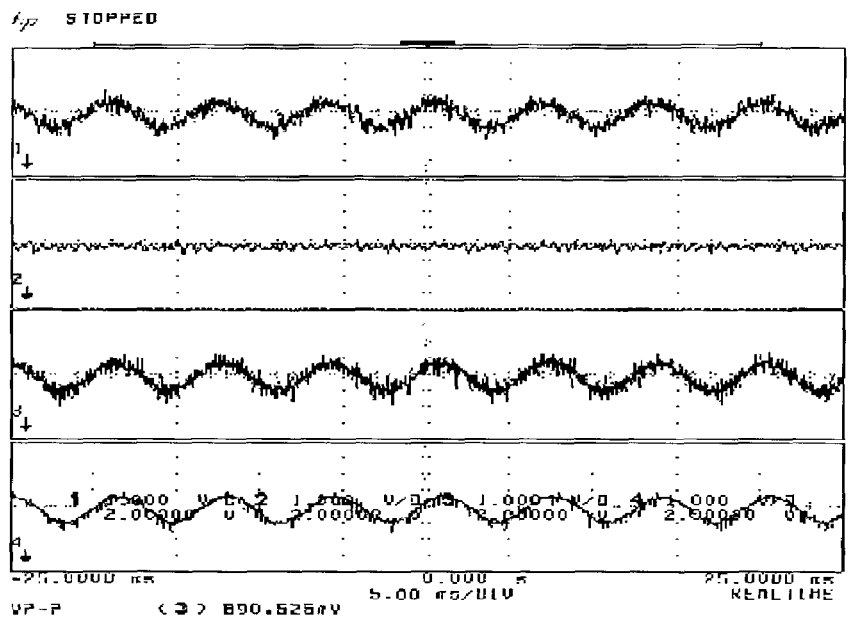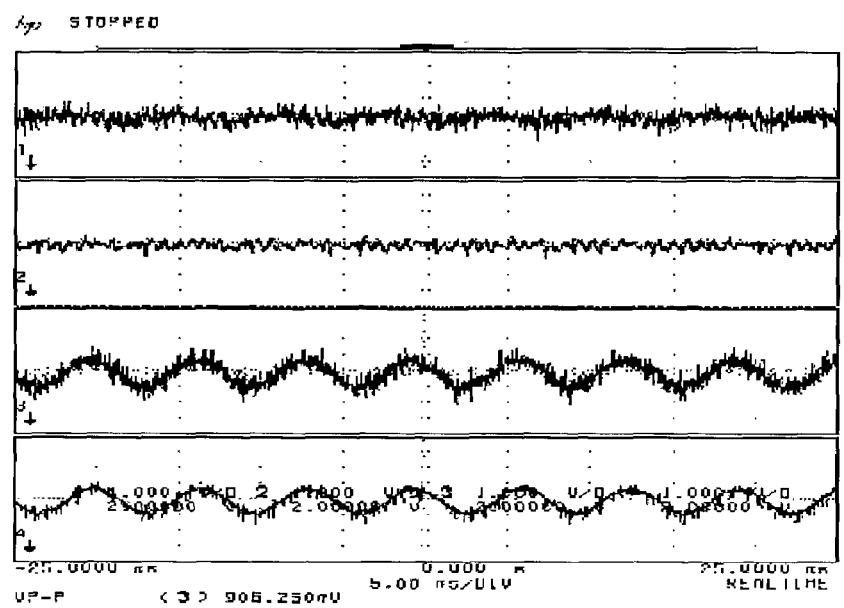

APPARATUS AND METHOD OF REMOVING DISTURBANCES DURING OPTICAL RECORDING AND/OR REPRODUCING

CROSS-REFERENCE TO RELATED APPLICATIONS

This application claims the benefit of Korean Application No. 2001-53847, filed Sep. 3, 2001 in the Korean Intellectual Property Office, the disclosure of which is incorporated herein by reference.

BACKGROUND OF THE INVENTION

1. Field of the Invention

The present invention relates to an apparatus and method of operating a recording medium, and more particularly, to an apparatus and method of removing a disturbance in a recording medium having a large eccentricity and deflection.

2. Description of the Related Art

The eccentric mass of a disc in an optical recording medium drive system is caused by a discrepancy between a spindle rotation axis for rotating a disc, the center of a track of the disc and different curvature characteristics of the optical recording medium. Further, the distance between a pickup and an optical recording medium may change according to the shape of the recording medium, or because its surface shakes as the recording medium rotates. In particular, such a change occurs when the surface of the optical recording medium vibrates in the vertical direction of the optical recording medium, which is referred to as "deflection".

The eccentricity and deflection of the optical recording medium are major factors causing a disturbance in an optical recording medium drive system, and clearly affect the recording and reproducing capability of the optical recording medium drive system at a high playback speed. Therefore, the eccentricity and deflection must be compensated in order to precisely follow a track. In the past, the eccentricity of an optical recording medium has been compensated using a learning control algorithm.

FIG. 1 is a block diagram of a tracking control system including a conventional repetition learning control structure. This tracking control system includes a sensor K(S) 10, a controller C(S) 11, a driver V(S) 12, an actuator P(S) 13, and a repetition learning controller 14. The sensor K(S) 10 outputs a tracking error signal e(t) containing information on the center of a track and the position of a pickup. The sensor K(S) 10 includes a photo diode (not shown) that detects the extent to which a pickup (not shown) deviates from a pre-focus position or the center of a track, and a radio-frequency (RF) amplifier (not shown) that amplifies a signal output from the photo diode and outputs the tracking error signal e(t). The controller C(S) 11 receives the tracking error signal e(t) output from the sensor K(S), and outputs a compensation signal instructing the pickup to be positioned at the center of a track even if a disturbance of the track occurs. The compensation signal output from the controller C(S) 11 is applied to the actuator P(S) 13 via the driver V(S) 12.

In an optical recording medium drive system, disturbances occur for many reasons. For example, noise causes a disturbance. However, a main factor in causing disturbances is the eccentricity of a disc. The disturbance due to the eccentricity of a disc is caused by the rotation of the disc, and occurs periodically in accordance with the disc rotation frequency. The disturbance due to eccentricity contributes to the tracking error. In general, an increase in the eccentricity mass of a disc results in an increase in the size of a periodic disturbance component of the tracking error. Thus it is difficult to compensate for such a periodic disturbance with only the controller C(S) 11. For this reason, a repetition learning control is performed by the repetition learning controller 14 so as to cancel the periodic disturbance.

The repetition learning controller 14 reads an output $U_{fb}(t)$ of the controller C(S) 11 in response to an FG signal, which is a synchronization signal used to judge a period, and stores data $U_{ff}(t)$, which is to be compensated in a memory 14-2 according to a learning control algorithm 14-1. Once the compensation of the data $U_{ff}(t)$ is completed according to the learning control algorithm 14-1, the data $U_{ff}(t)$ is combined with the output $U_{fb}(t)$ to produce a signal U(t) which is applied to the actuator P(S) 13. As a result, the periodic disturbance due to the eccentricity of the disc is canceled. The performance of the repetition learning controller 14 depends on how much data is stored in the memory 14-2 during a rotation period of a disc.

There are two main methods of learning data using the repetition learning controller 14. One method is to store an output of the controller C(S) 11 in the memory 14-2 during one period of the FG signal, and output the data stored in the memory 14-2 in synchronization with the FG signal during the next period. An advantage of this method is that learning time is short, but the method can only be used on the assumption that the controller C(S) 11 is operating normally.

The other method is to repeatedly learn data for several periods until the size of a tracking error is reduced by a certain degree. In detail, the data $U_{ff}(t)$ output from the learning control algorithm 14-1 is repeatedly learned in consideration of an output of repetition learning performed during the previous period, and a tracking error. Here, the data is continuously learned over several periods. Therefore, the more periods over which the learning is repeated, the more the periodic disturbance contained in a tracking error can be reduced. That is, continuously learning a periodic disturbance makes it possible to cancel as much of the periodic disturbance as possible. However, this method requires a lot of time for repetition learning.

Meanwhile, a repetition learning algorithm uses an FG signal so as to synchronize period. Here, the FG signal has a three or six period according to the phase of a spindle motor during which a disc is rotated for one period. During one rotation period of a disc, the less the number of FG signals, the less the number of FG edges through which synchronization of a period is checked. Thus, the performance of the repetition learning algorithm 14-1 is lowered. In general, the performance of the repetition learning algorithm 14-1 depends on how much data can be stored and output during one rotation period of a disc. However, if the amount of data to be stored is increased, the sampling frequency increases and the capacity of the memory 14-2 in which the data is stored must be increased. On the other hand, if the amount of data to be stored is small, the resolution of the repetition learning controller 14 becomes poor and the performance of the repetition learning algorithm 14-1 deteriorates.

Further, a high performance microcontroller (not shown) or a programmable digital signal processor (DSP) (not shown) is required to apply a repetition learning algorithm 14-1 to a conventional tracking control system. However, in fact, most optical recording medium drive systems use a hard-wired DSP and an inexpensive 8-bit microcontroller. Therefore, a repetition learning algorithm 14-1, which places a burden on the system, is not available.

SUMMARY OF THE INVENTION

To solve the above and other problems, it is an object of the present invention to provide an apparatus to remove periodic disturbances occurring in a recording medium, the apparatus including a repetition learning controller that can be easily fabricated as hardware without a memory.

It is another object of the present invention to provide a method of excluding periodic disturbances occurring in a recording medium, the method using a repetition learning controller that can be easily fabricated as hardware without a memory.

Additional objects and advantages of the invention will be set forth in part in the description which follows and, in part, will be obvious from the description, or may be learned by practice of the invention.

Accordingly, an apparatus to remove periodic disturbances in a recording medium according to an embodiment of the invention includes an actuator to change a position of a pickup, which records and/or reproduces data on or from a track of a recording medium, in response to a combination of first and second compensation signals; an error detector to detect an error between the positions of the actuator and the recording medium when the actuator deviates from referenced upper, lower, right and left positions of the recording medium; a first compensator to receive the detected error and to output a first compensation signal that the actuator uses to actuate the pickup along the recording medium in upper and lower directions, and right and left directions; and a second compensator to output a second compensation signal from which a periodic disturbance has been removed by compensating for the detected error, to combine the compensated error and the previous first and second compensation signals, and to filter the combined result at a predetermined bandwidth.

According to another embodiment of the present invention, an apparatus to remove periodic disturbances in a recording medium includes an actuator to change the position of a pickup, which records and/or reproduces data on or from a track of a recording medium, in response to a combination of first and second compensation signals; an error detector to detect an error between the positions of the actuator and the recording medium when the actuator deviates from referenced upper, lower, right and left positions of the recording medium; a first compensator to receive the detected error and to output a first compensation signal that allows the actuator to actuate the pickup along the recording medium in upper and lower directions, and right and left directions; and a second compensator to output a second compensation signal from which periodic disturbance has been removed by compensating for the detected error, to combine the compensated error and the previous first and second compensation signals, and to filter the combined result at a predetermined bandwidth.

According to a further embodiment of the present invention, a method of removing periodic disturbances in a recording medium includes detecting an error between a position of an actuator and referenced upper, lower, right and left positions of a recording medium when the recording medium drive system is operated; receiving the detected error and outputting a first compensation signal which allows the actuator to actuate the pickup along the recording medium in upper and lower directions, or right and left directions; compensating for the detected error based on a modeling error of the actuator, combining the compensated error and the previous first and second compensation signals, filtering the combined result to a predetermined bandwidth, and outputting the second compensation signal from which the periodic disturbance, which is contained in the combined result, has been removed; and changing the position of operating the actuator according to the combination of the first and second compensation signals.

According to an additional embodiment of the present invention, a method of removing periodic disturbances in a recording medium includes detecting an error between a position of an actuator and reference upper, lower, right and left positions of a recording medium when the recording medium drive system is operated; receiving the detected error and outputting a compensation signal that allows the actuator to actuate the pickup along the recording medium in upper and lower directions, and right and left directions; filtering a combination of the previous first compensation signal and a second compensation signal with a predetermined bandwidth, and outputting the second compensation signal from which the periodic disturbances, which are contained in the original first and second compensation signal, has been removed; and changing the position of operating the actuator according to the combination of the first and second compensation signals.

BRIEF DESCRIPTION OF THE DRAWINGS

The above and other object and advantages of the present invention will become more apparent and more readily appreciated by describing in detail embodiments thereof with reference to the accompanying drawings in which:

FIGS. 6A through 6D are waveform diagrams of a tracking error signal and a tracking output signal when a disc is rotated in an apparatus to remove disturbances in a recording medium having no modify-disturbance observer; and FIGS. 6 through 6H are waveform diagrams of a tracking error signal and a tracking output signal when a disc is rotated in an apparatus according to an embodiment of the present invention to remove disturbances in a recording medium having an MA-DOB.

DETAILED DESCRIPTION OF THE EMBODIMENTS

Figure 1:
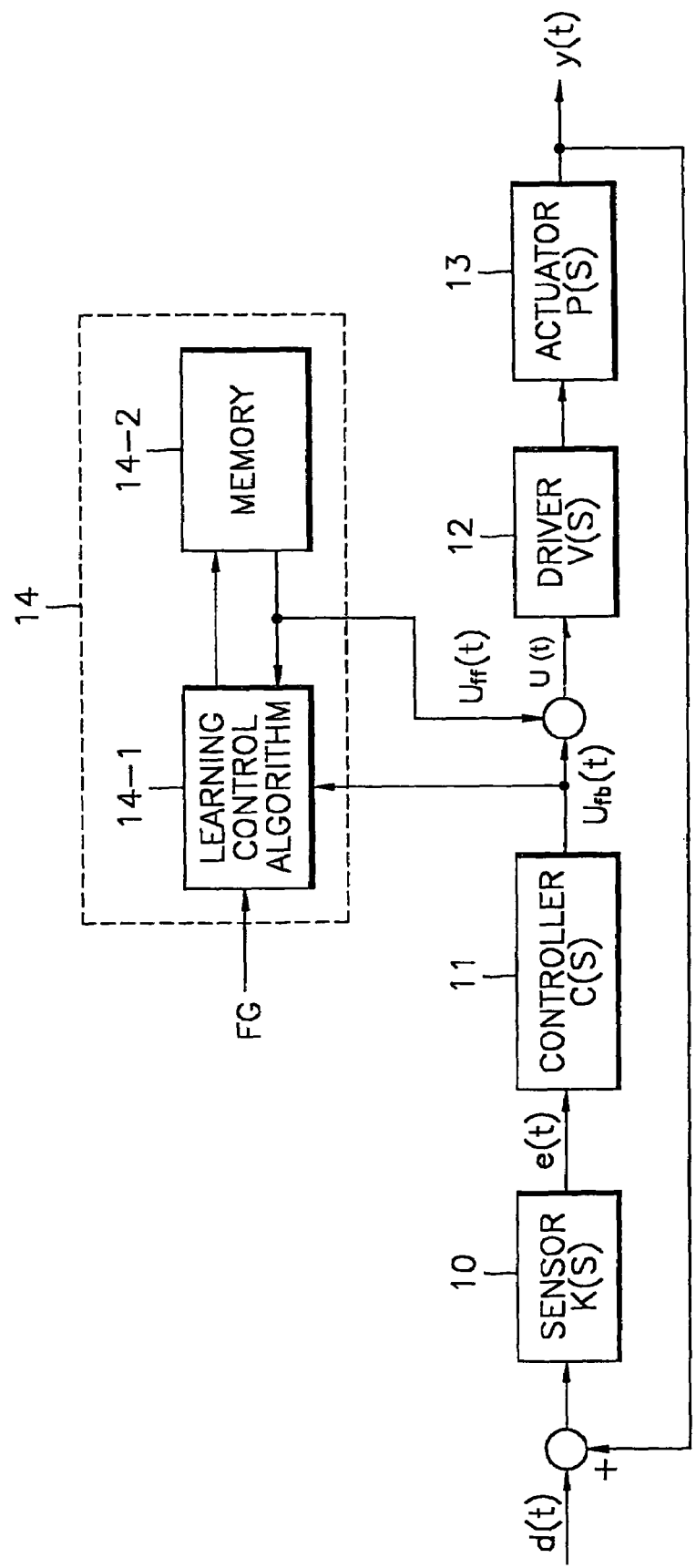
FIG. 1 is a block diagram of a tracking control system having a conventional repetition learning controller.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
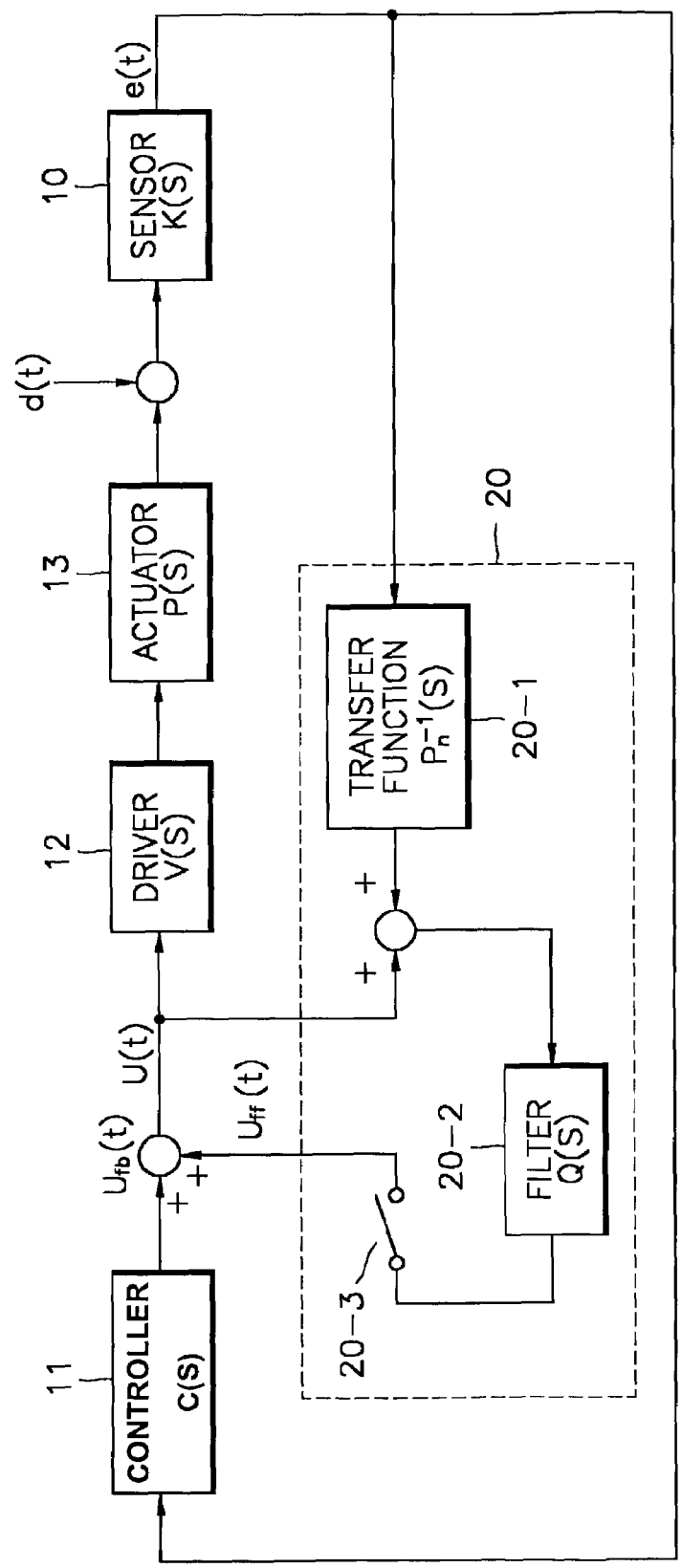
FIG. 2 is a block diagram of an embodiment of an apparatus to remove disturbances in a recording medium according to the present invention.

FIG. 2 is a block diagram of an embodiment of an apparatus to remove disturbances in a recording medium according to the present invention. This apparatus includes a sensor K(S) 10, a controller C(S) 11, a driver V(S) 12, an actuator P(S) 13, and a disturbance observer (hereinafter, "DOB" ) 20. The DOB 20 according to the present invention includes a transfer function $P_n^{-1}(S)$ 20-1, a filter Q(S) 20-2, and a switch 20-3.

The sensor K(S) 10 outputs a tracking and focus error signal e(t) that contains information regarding the center of a track and the position of a pickup. The sensor K(S) 10 includes a photo diode (not shown) that detects a degree that a pickup (not shown) deviates from a pre-focus position (e.g., upper/lower relative to the prefocus position) or the center of a track (e.g., left/right of the center of the track), and a radio frequency (RF) amplifier (not shown) that amplifies a signal output from the photo diode and outputs the tracking and focus error signal e(t). The controller C(S) 11 receives the tracking and focus error signal e(t) output from the sensor K(S) 10, and outputs a first compensation signal $U_{fb}$ (t) to position the sensor K(S) 10 at the pre-focus position or the center of a track (i.e., repositioning the actuator P(S) 13 to actuate the pickup to be upper/lower along the pre-focus position or left/right to the center of the track ) when a disturbance d(t) is caused by the deviation of the pickup from the pre-focus position or the center of a track.

A final compensation signal U(t) from which the periodic disturbance is removed is input to the actuator P(S) 13 via the driver V(S) 12. The actuator P(S) 13 receives the compensation signal U(t) and changes the position of the pickup, which records or reproduces data on or from a track of a recording medium.

An increase in the eccentricity mass or deflection mass of a disc results in an increase in the periodic disturbance component of tracking and focus error. Accordingly, a tracking and focus loop gain is relatively increased. The DOB 20 compensates for and effectively controls a periodic disturbance that becomes more intense at a particular frequency component. The DOB 20 outputs a second compensation signal $U_{ff}(t)$, in which the periodic disturbance is removed from the tracking and focus error signal e(t) output from the sensor K(S) 10 and the previous final compensation signal U(t) input to the actuator P(S) 13.

The final compensation signal U(t) input to the actuator P(S) 13 is a signal obtained by combining the signal $U_{fb}(t)$ output from the controller C(S) 11, which compensates for the disturbance of a predetermined frequency, and the signal $U_{ff}(t)$ output from the DOB 20, which contains the periodic disturbance of a particular frequency. This can be expressed as follows:

$$U(t)=U_{fb}(t)+U_{ff}(t) \ldots \quad (1)$$

In the operation of the DOB 20 that outputs the compensation signal $U_{ff}(t)$, the transfer function $P_n(S)$ is a transfer function that indicates nominal loop gains for the sensor K(S) 10, driver V(S), and actuator P(S) 13 except for the controller C(S)11 and can be calculated by multiplying the gains of the nominal sensor K(S) 10, the nominal driver V(S) 12, and the nominal actuator P(S) 13. The gain of the transfer function $P_n(S)$ is very large, whereas the gain of the transfer function $P_n^{-1}(S)$, which is the inverse transfer function of $P_n(S)$, is very small. The transfer function $P_n^{-1}(S)$ 20-1 receives the tracking and focus error signal from the sensor K(S) 10, compensates for a modeling error between the tracking and focus error signal and the transfer function $P_n(S)$, and outputs the result.

A compensation signal output from the transfer function $P_n^{-1}(S)$ 20-1 and the previous final compensated signal U(t) input to the actuator P(S) 13 are combined and input to the filter Q(S) 20-2. Then, the filter Q(S) 20-2 removes the periodic disturbance at a particular frequency from the combined compensation signal, and outputs the result. Here, the gain of the filter Q(S) 20-2 is set to be 1, and its bandwidth is determined by the playback speed of an optical recording medium drive system. The bandwidth of the filter Q(S) 20-2 is determined in consideration of every possible playback speed of the optical recording medium drive system. Thus, even if the playback speed changes, the DOB 20 can operate normally. Further, it is possible to significantly reduce the time required to stabilize the recording medium when the playback speed changes because the bandwidth of the filter Q(S) 20-2 is realized as analogue data. The compensation signal $U_{ff}(t)$ output from the filter Q(S) 20-2 can be expressed in the frequency domain as follows:

$$U_{ff}(S)=Q(s)U(s)+Q(s)P_n^{-1}(s)E(s) \ldots \quad (2)$$

The DOB 20 is operated or deactivated by switching the switch 20-3 on or off, and the optical recording medium drive system performs the interlocking of tracks and jumping between tracks alternately. When jumping to a certain track or searching for a track, the switch 20-3 is switched off so that the DOB 20 does not operate when a tracking error is detected and switched on to operate the DOB 20 when a focus error is detected. The reason for using the DOB 20 is to exclude the periodic disturbance due to the eccentricity or deflection mass of a disc in the optical recording medium drive system. Therefore, the DOB 20 does not operate in a section in which jumping to a certain track or searching a track is performed, at which time a tracking error containing a speed control component is detected; and the DOB 20 does operate in a section in which jumping to a certain track or searching for a track is performed, at which time a focus error containing the speed control component is detected. Here, switching the switch 20-3 on or off is carried out by a microcomputer (not shown).

Figure 3:
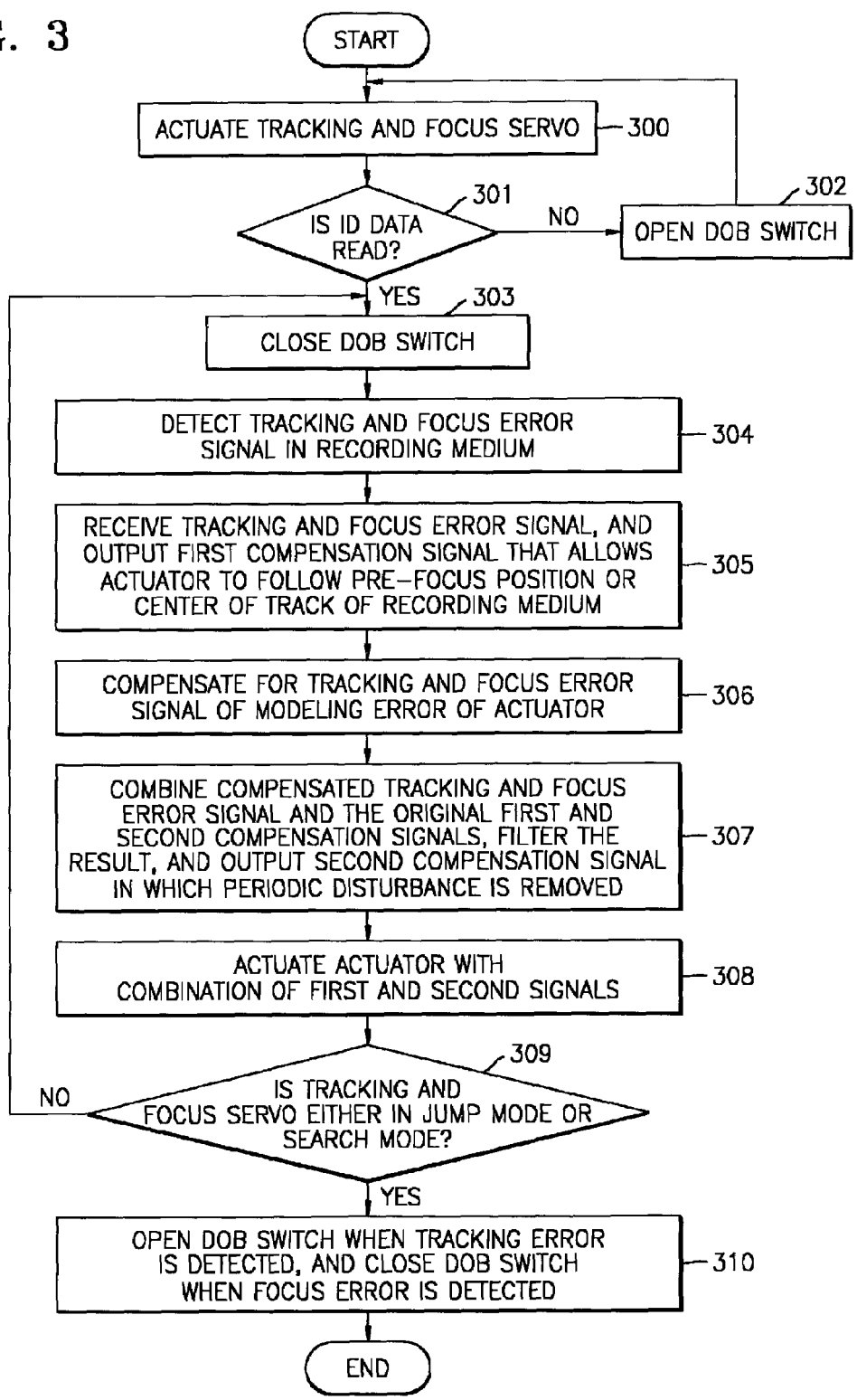
FIG. 3 is a flow chart explaining an embodiment of a method of removing disturbances in a recording medium according to the present invention.

FIG. 3 is a flow chart explaining an embodiment of a method of removing disturbance in a recording medium according to the present invention. In the method, a tracking and focus servo is operated (operation 300). Then, it is checked whether ID data is read (operation 301). At this time, the DOB 20 is not switched on. The DOB 20 is not switched on until the operation of the tracking and focus servo is normalized. It is determined whether or not the tracking and focus servo is operating normally by reading ID data such as SUB-Q, Wobble or DVD ID and checking the effectiveness of the ID data.

If it is determined that the ID data is not readable in operation 301, the microcomputer outputs a control signal to switch the switch 20-3 off, and stops the operation of the DOB 20 (operation 302). On the other hand, if it is determined that the ID data is read and tracking control can be normally performed, the microcomputer outputs a control signal to switch the switch 20-3 on, and operates the DOB 20 (operation 303).

If the DOB 20 is operated, the recording medium detects a tracking and focus error signal e(t) (operation 304). Here, the tracking and focus error signal e(t) is output from the sensor K(S) 10 that detects the extent to which a pickup (not shown) deviates from a pre-focus position or the center of a track. The sensor K(S) 10 includes a photo diode (not shown), and an RF amplifier (not shown) that amplifies a signal output from the photo diode and outputs the tracking and focus error signal e(t).

After operation 304, the controller C(S) 11 receives the detected tracking and focus error signal e(t), and outputs a first compensation signal $U_{fb}(t)$ from which a disturbance at a predetermined frequency is removed and which instructs the actuator P(S) 13 to be positioned at the pre-focus position or the center of a track of a recording medium (i.e., repositioning the actuator P(S) to actuate the pickup in the upper and lower, or right and left directions) (operation 305).

After operation 305, the transfer function $P_n^{-1}$ 20-1 of the DOB 20 multiplies a gain of the nominal sensor K(S) 10, a gain of the nominal driver V(S) 12, and a gain of the nominal actuator P(S) 13, compensates for a modeling error between the tracking and focus signal and the transfer function $P_n(S)$, and outputs the result (operation 306).

The filter Q(S) 20-2 of the DOB 20 combines the compensated tracking error signal e(t) and the previous final compensation signal U(t) input to the actuator P(S) 13, filters the combined result, and outputs a second compensation signal $U_{ff}(t)$ in which a periodic disturbance is compensated (operation 307). Here, a gain of the filter Q(S) 20-2 is set to be 1, and the bandwidth of the filter Q(S) 20-2 is determined according to the playback speed of an optical recording medium driver system. Since the bandwidth of the filter Q(S) 20-2 is determined in consideration of every possible playback speed, the DOB 20 can operate normally even when the playback speed of an optical recording medium drive system changes. Also, the bandwidth of the filter Q(S) 20-2 is realized as analog data, and thus, it is possible to considerably reduce the time required to stabilize an unstable optical recording medium drive system due to a change in the playback speed.

After operation 307, the first compensation signal $U_{fb}(t)$ output from the controller C(S) 11, from which a disturbance at a predetermined frequency is removed, and the second compensation signal $U_{ff}(t)$ output from the filter Q(S) 20-2, from which a periodic disturbance at a particular frequency is removed, are combined and input to the actuator P(S) 13 (operation 308). The actuator P(S) 13 receives the result U(t) (i.e., $U_{fb}(t)+U_{ff}(t)$) and changes the position of the pickup.

After operation 308, it is checked if the tracking and focus servo is in one of a jump mode and a search mode (operation 309). If it is determined in operation 309 that the tracking and focus servo is in one of the jump mode and the search mode, the switch 20-3 is opened so as to stop the operation of the DOB 20 when a tracking error is detected. If the tracking and focus servo is in neither the jump mode nor the search mode, the switch 20-3 is closed to operate the DOB 20 when a focus error is detected (operation 310). The optical recording medium drive system performs the interlocking of tracks and the jumping to a certain track alternately. Therefore, while jumping to a certain track or searching for a track is performed in the optical recording medium drive system, the switch 20-3 is switched off so as not to operate the DOB 20 when a tracking error is detected. On the other hand, the switch 20-3 is switched on to operate the DOB 20 when a focus error is detected. This is because the DOB 20 is adopted to remove periodic eccentricity and deflection disturbance in an optical recording medium drive system in this embodiment. Thus, the DOB 20 does not operate in a section in which jumping to a certain track or searching for a track is performed, at which time a tracking error containing a speed control component is detected; and the DOB 20 does operate in a section in which jumping to a certain track or searching a track is performed, at which time a focus error containing the speed control component is detected.

If it is determined in operation 309 that the tracking and focus servo is not in the jump mode or the search mode, disturbances in the optical recording medium drive system are repeatedly removed by returning back to operation 303.

Figure 4:
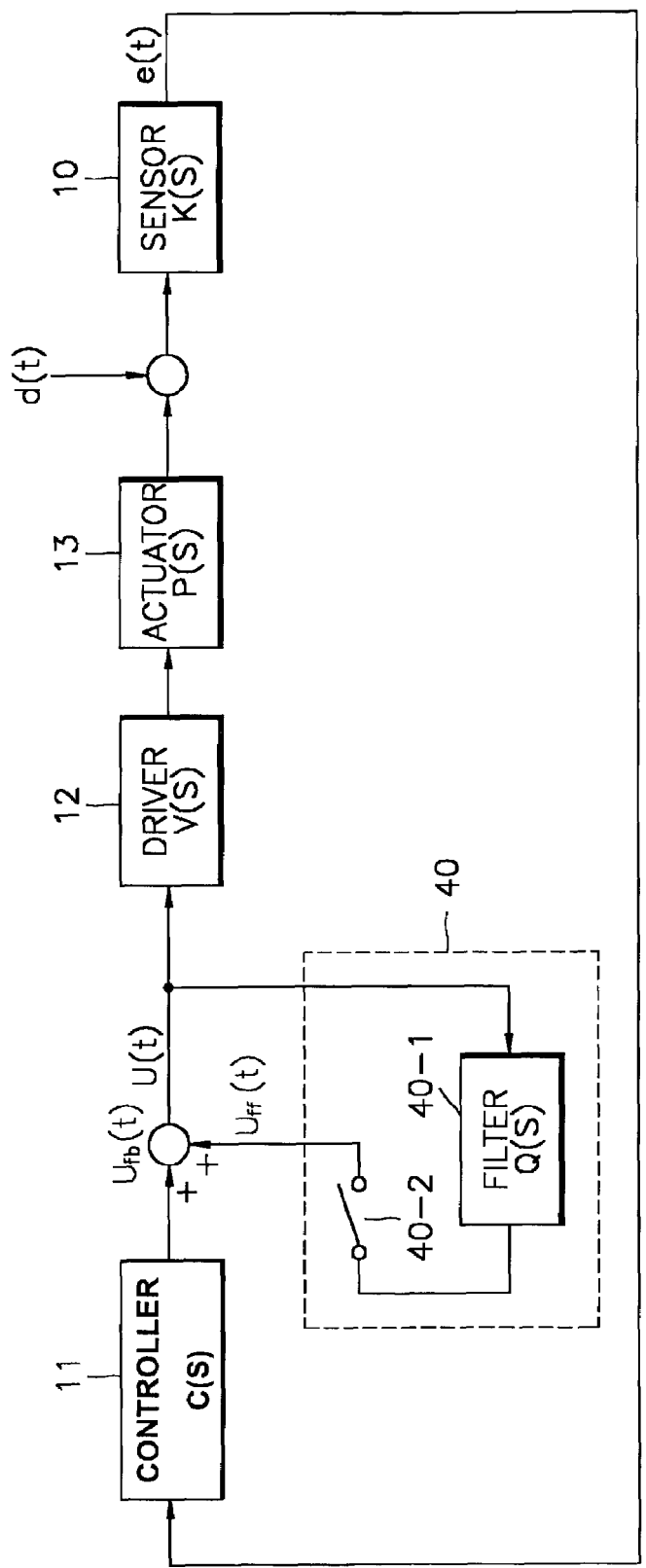
FIG. 4 is a block diagram of another embodiment of an apparatus to remove disturbances in a recording medium according to the present invention.

FIG. 4 is a block diagram of another embodiment of an apparatus for excluding a disturbance in an optical recording medium drive system according to the present invention. This apparatus includes a sensor K(S) 10, a controller C(S) 11, a driver V(S) 12, an actuator P(S) 13, and a modify-disturbance observer (hereinafter "MA-DOB") 40. In this embodiment, the MA-DOB 40 includes a filter Q(S) 40-1 and a switch 40-2.

The sensor K(S) 10 outputs a tracking and focus error signal e(t) containing information on the center of a track and the position of a pickup. For this operation, the sensor K(S) 10 includes a photo diode (not shown) that detects to the extent to which a pickup (not shown) deviates from a pre-focus position or the center of a track, and an RF amplifier (not shown) which amplifies a signal output from the photo diode and outputs the result as the tracking and focus error e(t).

The controller C(S) 11 receives the tracking and focus error signal e(t) from the sensor K(S) 10, and outputs a first compensation signal $U_{fb}(t)$ instructing the pickup to be positioned at a pre-focus position or the center of a track (i.e., repositioning the actuator P(S) 13) in the event that the disturbance d(t) is caused by the deviation of the pickup from the pre-focus position or the center of a track. A final compensation signal U(t), from which the periodic disturbance has been removed, is applied to the actuator P(S) 13 via the driver V(S) 12. Then, the actuator P(S) 13 receives the final compensation signal U(t), and changes the position of the pickup that records or reproduces data on or from a track of a recording medium.

An increase in the eccentricity or deflection mass of a disc results in an increase in periodic disturbance in the tracking and focus error. Accordingly, a tracking and focus loop gain in eccentricity and deflection disturbance frequency is relatively increased. In order to effectively cancel a disturbance which is intense at a particular frequency component, the MA-DOB 40 is used to compensate for a periodic disturbance of the particular frequency component. Here, the MA-DOB 40 is a modified DOB 20 of FIG. 2. Since a gain of a transfer function $P_n(S)$ of the DOB 20 is very large, a gain of a transfer function $P_n^{-1}(S)$, which is the inverse function of the transfer function $P_n(S)$, is very small and thus difficult to be realized by hardware. Accordingly, the MA-DO B 40 is a modified DOB 20 in which the gain of the transfer function $P_n^{-1}(S)$ is omitted.

The MD-DOB 40 filters the previous final compensation signal U(t), which is input to the actuator P(S) 13 and outputs a second compensation signal $U_{ff}(t)$ from which periodic disturbance has been removed.

The final compensation signal U(t) input to the actuator P(S) 13 becomes a signal that is made by combining the signal $U_{fb}(t)$ output from the controller K(S), and the signal $U_{ff}(t)$ output from the MA-DOB 40 is expressed as follows:

$$U(t)=U_{fb}(t)+U_{ff}(t) \ldots \quad (3)$$

Hereinafter, the operation of the MA-DOB 40 that outputs the second compensation signal $U_{ff}(t)$ will be described. The filter Q(S) 40-1 filters a periodic disturbance component of a particular frequency from the previous final compensation signal U(t) input to the actuator P(S) 13 and outputs the result. Here, the gain of the filter Q(S) 40-1 is set to be 1, and its bandwidth is determined according to the playback speed of an optical recording medium drive system used. The bandwidth of the filter Q(S) 40-1 is determined in consideration of every possible playback speed thereof, and therefore, the MA-DOB 40 can operate normally even if the playback speed changes. Further, since the bandwidth is realized as analog data, the time required to stabilize a recording medium when the playback speed changes can be significantly reduced. The second compensation signal $U_{fb}(t)$ output from the filter Q(S) 40-1 can be expressed in the frequency domain as follows:

$$U_{ff}(s) = Q(s)U(s) \ldots \quad (4)$$

The switch 40-2 is switched on to operate the MA-DOB 40, and switched off to stop the operation of the MA-DOB 40. An optical recording medium drive system carries out the interlocking of tracks and jumping to a certain track alternately. Thus, during such an operation of the optical recording medium drive system, the MA-DOB 40 is disabled by opening the switch 40-2 when a tracking error is detected, and is enabled by closing the switch 40-2 when a focus error is detected. This is because the operation of the switch 40-2 is performed so as to remove the disturbance due to the periodic eccentricity or deflection of a disc. Therefore, it is important to not operate the MA-DOB 40 in a section during the jumping to or searching for a certain track at which time a speed control component is included in a tracking error. On the other hand, the MA-DOB 40 does operate in a section during the jumping to or searching for a certain track at which time a speed control component is included in a focus error. A microcomputer (not shown) is used to switch the switch 40-2 on or off.

FIGS. 6A through 6D are waveform diagrams of a tracking error signal CH1 and a tracking output signal CH3 generated when a digital versatile disc (DVD), which is eccentric to 50 μm, is rotated at 12-times (12×) playback speed and an apparatus for excluding disturbance which does not include a MA-DOB is used. Here, CH2 and CH4 of FIGS. 6B and 6D denote a focus error signal and a focus output signal, respectively. From FIG. 6A, it is noted that an uncontrolled periodic disturbance component is mostly contained in the tracking error signal CH1.

FIGS. 6E through 6H are waveform diagrams of a tracking error signal and a tracking output signal when a digital versatile disc (DVD), which is eccentric to 50 μm, is rotated at 12×playback speed and an apparatus for excluding a disturbance which includes an MA-DOB according to an embodiment of the present invention is used. FIG. 6E reveals that the periodic disturbance is compensated by the MA-DOB. As such, the tracking error signal does not contain an uncontrolled periodic disturbance component.

Figure 5:
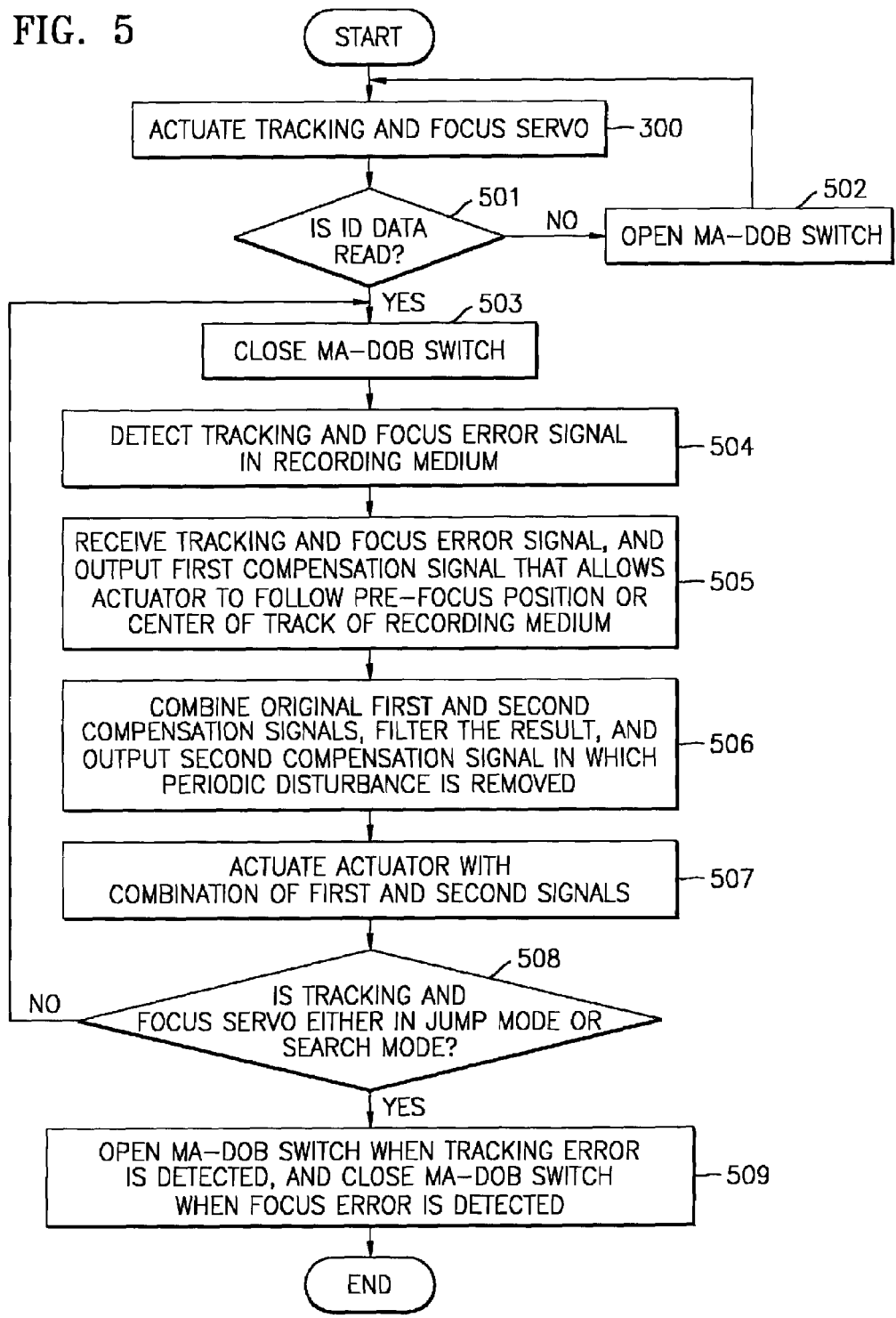
FIG. 5 is a flow chart explaining an embodiment of a method of removing disturbances in a recording medium according to the present invention.

FIG. 5 is a flow chart explaining another embodiment of a method according to the present invention of excluding a disturbance in an optical recording medium drive system. In this method, a tracking and focus servo is operated (operation 500), and then it is checked whether ID data, such as SUB-Q, Wobble and DVD ID, is read (operation 501). The MA-DOB 40 is operated until the tracking and focus servo operates normally. It is determined whether or not the tracking and focus servo operates normally by reading the ID data and checking if the ID data is available.

If it is determined in operation 501 that the ID data is not read, a microcontroller outputs a control signal to open a switch 40-2 so as to stop the operation of the MA-DOB 40 (operation 502). On the other hand, if it is determined in operation 501 that the ID data is read (i.e., the tracking and focus servo operates normally), the microcomputer outputs a control signal to close the switch 40-2 so as to operate the MA-DOB 40 (operation 503).

Once the MA-DOB 40 operates, it is detected whether a tracking and focus error signal e(t) is present in a recording medium (operation 504). Here, the tracking and focus error signal e(t) is generated by the sensor K(S) 10. The sensor K(S) 10 includes a photo diode (not shown) that detects the extent to which a pickup (not shown) deviates from a pre-focus position or the center of a track, and an RF amplifier (not shown) that amplifies a signal output from the photo diode and outputs the result as the tracking and focus error e(t).

After operation 504, the controller C(S) 11 receives the tracking and focus error signal e(t), and outputs a first compensation signal $U_{fb}(t)$ from which a disturbance at a particular frequency is removed so that the actuator P(S) 13 is positioned at a pre-focus position of a recording medium or the center of a track (i.e., the actuator P(s) 13 is repositioned to actuate the pickup in upper and lower directions, or right and left directions (operation 505).

The MA-DOB 40, in which a transfer function $P_n^{-1}(S)$ 20-1 shown in FIG. 2 is omitted, filters the previous final compensation signal U(t) which is input to the actuator P(S) 13, and outputs a second compensation signal $U_{ff}(t)$ from which a periodic disturbance has been removed. Here, the gain of the filter Q(S) 40-1 is set to be 1, and its bandwidth is determined according to the playback speed of an optical recording medium drive system used. The bandwidth of the filter Q(S) 40-1 is determined in consideration of every possible speed of an optical recording medium drive system. Therefore, even if the playback speed changes, the MA-DOB 40 can operate normally. Further, it is possible to considerably reduce the time required to stabilize a recording medium when the playback speed changes because the bandwidth of the filter Q(S) 20-2 is realized as analogue data.

After operation 506, a first compensation signal $U_{fb}(t)$ output from the controller C(S) 11 and the second compensation signal $U_{ff}(t)$ output from the filter Q(S) 40-1 are combined to make the final compensation signal U(t), which is input to the actuator P(S) 13 (operation 507). Then, in response to the received final compensation signal U(t), which is a combination of the first and second compensation signals $U_{fb}(t)$ and $U_{ff}(t)$, the actuator P(S) 13 changes the position of the pickup that records or reproduces data on or from a track of a recording medium.

After operation 507, it is checked if the tracking and focus servo is in one of a jump mode and search mode (operation 508). If it is determined in operation 508 that the tracking and focus servo is in one of the jump mode and the search mode, the switch 40-2 is opened to stop the operation of the MA-DOB 40 when a tracking error is detected. On the other hand, the switch is closed to operate the MA-DOB 40 when a focus error is detected (operation 509). An optical recording medium drive system performs the interlocking of tracks and the jumping to a certain track alternately. During jumping to or searching for a track, the switch 40-2 is switched off to stop the operation of the MA-DOB 40 when a tracking error is detected, and switched on to operate the MA-DOB 40 when a focus error is detected. Here, the reason for using the MA-DOB 40 is to exclude the periodic disturbance due to the eccentricity or deflection mass of a disc in the optical recording medium drive system. Therefore, the MA-DOB 40 does not operate in a section in which jumping to or searching for a track is performed, at which time a tracking error containing a speed control component is detected, whereas the MA-DOB 40 operates in a section in which jumping to or searching a track is performed, at which time a focus error containing the speed control component is detected.

If it is determined in operation 508 that the tracking and focus servo is not in the jump mode or search mode, operations for removing a disturbance are repeatedly carried out by returning back to operation 503.

The DOB 20 of FIG. 2 and the MA-DOB 40 of FIG. 4 can be realized as a program because they do not require a memory in which data is stored or reproduced, unlike the conventional repetition learning system 14 of FIG. 1. The programming of the DOB 20 and the MA-DOB 40, however, requires two digital filters as in the repetition learning controller 14. An increase in control bandwidth results in an increase in digital sampling frequency. Accordingly, the DOB 20 and the MA-DOB 40 can be realized by firmware used by a DSP or a microcontroller having reasonable performance as in the repetition learning controller 14 of FIG. 1.

As described above, according to the present invention, a DOB or MA-DOB is installed in an optical recording medium drive system and therefore, a periodic disturbance can be effectively cancelled, thereby stabilizing a tracking and focus servo. Also, the DOB or MA-DOB can be simply realized by hardware, and thus are applicable to an optical recording medium drive system using an inexpensive low-performance microcontroller. Further, the DOB or MA-DOB can be also realized as a program as well as by hardware, and thus, can be installed in a DSP or microcontroller having good performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to exclude a disturbance for use with a recording medium drive system which records and/or reproduces data with respect to a recording medium, the apparatus comprising:
    an actuator to change a position of a pickup, which transfers data on or from a track of the recording medium, in response to a combination compensation signal;
    an error detector to detect an error between the positions of the actuator and the recording medium when the actuator deviates from referenced upper, lower, right and left positions of the recording medium;
    a first compensator to receive the detected error and to output a next first compensation signal that allows the actuator to actuate the pickup along the recording medium in upper and lower directions, and right and left directions; and
    second compensation means for outputting a next second compensation signal to be combined with the next first compensation signal to provide the combination compensation signal used by the actuator to change the position of the pickup, the output next second compensation having a periodic disturbance removed by compensating for the error detected by the error detector corresponding to a modeling error of the actuator, combining the compensated error and previous first and second compensation signals, and filtering the combined result at a predetermined bandwidth.

2. The apparatus of claim 1, wherein the second compensator comprises:
    a compensator to compensate for the detected error with regard to the modeling error of the actuator; and
    a filter to combine the compensated error and the previous first and second compensation signals, and to filter the result to the predetermined bandwidth so as to produce the next second compensation signal.

3. The apparatus of claim 2, wherein the predetermined bandwidth of the filter depends on a playback speed of the recording medium.

4. The apparatus of claim 1, wherein the second compensator further comprises a switch controlled to selectively allow an output of the next second compensation signal from the second compensator according to a type of the detected error.

5. The apparatus of claim 4, wherein the switch is open during jumping to or searching for a certain track of the recording medium if the detected error is the deviations in the referenced right and left positions of the recording medium.

6. The apparatus of claim 4, wherein the switch is closed during jumping to or searching for a certain track of the recording medium if the detected error is the deviations in the referenced upper and lower positions of the recording medium.

7. An apparatus to exclude a disturbance for use in a recording medium drive system which records and/or reproduces data with respect to a recording medium, the apparatus comprising:
    an actuator to change a position of a pickup, which transfer data on or from a track of the recording medium, in response to a combination compensation signal;
    an error detector to detect an error between the positions of the actuator and the recording medium when the actuator deviates from referenced upper, lower, right and left positions of the recording medium;
    a first compensator to receive the detected error and to output a next first compensation signal that allows the actuator to actuate the pickup along the recording medium in upper and lower directions, and right and left directions; and
    second compensation means for producing a next second compensation signal from which periodic disturbance has been rejected by combining previous first and second compensation signals, and filtering the combining result at a predetermined bandwidth to be output as the next second compensation signal to be combined with the next first compensation signal to provide the combination compensation signal for use by the actuator to change the position of the pickup.

8. The apparatus of claim 7, wherein the second compensator comprises:
    a filter to filter the previous first and second compensation signals to the predetermined bandwidth; and
    a switch to switch so as to selectively allow an output of the next second compensation signal from the second compensator according to the type of the detected error.

9. The apparatus of claim 8, wherein the predetermined bandwidth of the filter depends on a playback speed of the recording medium.

10. The apparatus of claim 8, wherein the switch is opened during jumping to or searching for a certain track of the recording medium if the detected error is the deviations between the referenced right and left positions of the recording medium.

11. The apparatus of claim 8, wherein the switch is closed during jumping to or searching for a certain track of the recording medium if the detected error is the deviations between the upper and lower referenced positions of the recording medium.

12. A method of excluding a disturbance while operating a recording medium drive system, the method comprising:
  detecting an error between a position of an actuator and referenced upper, lower, right and left positions of a recording medium when the recording medium drive system is operated;
  receiving the detected error and outputting a next first compensation signal which the actuator uses to actuate the pickup along the recording medium in upper and lower directions, or right and left directions;
  compensating for the detected error based on a modeling error of the actuator;
  combining the compensated error and previous first and second compensation signals to produce a combined result;
  filtering the combined result to a predetermined bandwidth;
  outputting a next second compensation signal from which a periodic disturbance, which is in the combined result, has been removed; and
  changing a position of the actuator according to a combination of the output next first compensation signal and the output next second compensation signal.

13. The method of claim 12, further comprising reading predetermined available data and checking if the recording medium drive system operates normally before the detecting the error, and if the recording medium drive operates normally, performing the detecting the error.

14. The method of claim 12, wherein the filtering the combined result comprises filtering with a filter having a gain of 1.

15. The method of claim 12, wherein the predetermined bandwidth of the filtering the combination of the first and second compensation signals depends on a playback speed of the recording medium drive system.

16. The method of claim 12, further comprising switching so as to selectively allow an output of the next second compensation signal according to a type of the detected error.

17. The method of claim 16, wherein the switching the output comprises switching such that the next second compensation signal is not output while the recording medium drive system performs jumping to or searching for a certain track of the recording medium if the detected error is the deviations between the referenced right and left positions of the recording medium.

18. The method of claim 16, wherein the switching the output comprises switching such that the next second compensation signal to be output while the recording medium drive system performs the jumping to or searching for a certain track of the recording medium if the detected error is the deviations between the referenced upper and lower positions of the recording medium.

19. A method of excluding a disturbance occurring when operating a recording medium drive system, the method comprising:
  detecting an error between a position of an actuator and reference upper, lower, right and left positions of a recording medium when the recording medium drive system is operated;
  receiving the detected error and outputting a next first compensation signal that the actuator uses to actuate the pickup along the recording medium in upper and lower directions, and right and left directions;
  filtering a combination of a previous first compensation signal and a previous second compensation signal with a predetermined bandwidth, and outputting a next second compensation signal from which a disturbance, which is in the combined previous first and second compensation signals, has been removed; and
  changing a position of the actuator according to a combination of the output next first compensation signal and the output next second compensation signal.

20. The method of claim 19 further comprising reading predetermined available data and checking whether the recording medium drive system operates normally prior to the detecting the error and, if the recording medium drive operates normally, performing the detecting the error.

21. The method of claim 19, further comprising:
  compensating for the detected error based on a modeling error of the actuator;
  combining the compensated error and the previous first and second compensation signals to be filtered during the filtering the combination of the previous first and second compensation signals at the predetermined bandwidth, and the outputting the next second compensation signal from which the disturbance has been removed; and
  switching to selectively allow an output of the next second compensation signal according to a type of the detected error.

22. The method of claim 21, wherein the bandwidth of the filtering the combination of the previous first and second compensation signals depends on a playback speed of the recording medium drive system.

23. The method of claim 21, wherein the switching the output comprises switching such that the next second compensation signal is not output while the recording medium drive system performs jumping to or searching for a certain track if the detected error is between the reference right and left positions of the actuator and the recording medium.

24. The method of claim 21, wherein the switching the output comprises switching such that the next second compensation signal is output while the recording medium drive system performs jumping to or searching for a certain track if the detected error is between the reference upper and lower positions of the actuator and the recording medium.

25. A recording and/or reproducing apparatus to record and/or reproduce data with respect to a recording medium, comprising:
  a recording and/or reproducing head to transfer the data between the recording medium and the recording and/or reproducing apparatus;
  a sensor to detect a tracking and focus error from the recording medium and to output a tracking and focus error signal;
  an actuator to actuate the optical head using a corrected control signal;
  a controller to control the actuator by outputting a control signal, in accordance with an input of the tracking and focus error signal, to control the rotation of the spindle; and
  a disturbance correction unit to generate a correction signal, which corrects for a periodic disturbance not removed by the controller, by filtering the corrected control signal, with the corrected control signal being produced by combining the correction signal and the control signal,
  wherein the sensor, the controller, and the actuator form a closed tracking and focus feed back loop to which a vibration of the recording medium including the periodic disturbance is applied.

26. The recording and/or reproducing apparatus of claim 25, wherein the disturbance correction unit comprises:

a filter which filters the corrected control signal supplied to the actuator at a predetermined bandwidth to remove the periodic disturbance so as to produce the correction signal, and a combining unit which combines the correction signal and the control signal to produce the corrected control signal to be supplied to the actuator.

27. The recording and/or reproducing apparatus of claim 26, wherein a relationship between the corrected control signal and the correction signal is expressed as follows:

$$U_{ff}(s)=Q(s)U(s),$$

$U_{ff}(s)$ is the correction signal in a frequency domain,
$Q(s)$ is the filter represented in the frequency domain, and
$U(s)$ is the corrected control signal supplied to the actuator represented in the frequency domain.

28. The recording and/or reproducing apparatus of claim 27, wherein a gain of the filter is 1, and the predetermined bandwidth of the filter is determined according to a playback speed of the disc.

29. The recording and/or reproducing apparatus of claim 28, where the disturbance correction unit further comprises a switch disposed between the filter and the combining unit so as to selectively output the correction signal according to a type of output tracking and focus error signal while the recording medium drive system performs jumping to or searching for a certain track.

30. The recording and/or reproducing apparatus of claim 29, where the switch outputs the correction signal the jumping to and the searching for the certain track are not performed.

31. The recording and/or reproducing apparatus of claim 29, where the switch outputs the correction signal where the jumping to or the searching for the certain track is performed if the type of the output tracking and focus error signal is for a focus error.

32. The recording and/or reproducing apparatus of claim 29, where the switch does not output the correction signal where the jumping to or the searching for the certain track is performed if the type of the output tracking and focus error signal is for a tracking error.

33. The recording and/or reproducing apparatus of claim 26, wherein:

the disturbance correction unit further comprises an error signal correction unit which receives the output tracking and focus error signal and produces a corrected error signal, the corrected error signal is filtered by the filter to produce the correction signal, and the error signal correction unit compensates for a modeling error between the output tracking and focus error signal and a transfer function corresponding to a nominal loop gain supplied by the actuator and the sensor.

34. The recording and/or reproducing apparatus of claim 33, wherein a relationship between the corrected control signal and the correction signal is expressed as follows:

$$U_{ff}(S)=Q(s)U(s)+Q(s)P_n^{-1}(s)E(s),$$

$U_{ff}(s)$ is the correction signal a frequency domain,
$Q(s)$ is the filter represented in the frequency domain,
$U(s)$ is the corrected control signal supplied to the actuator represented in the frequency domain,
$P_n^{-1}(s)$ is an inverse of the transfer function corresponding to the nominal loop gain supplied by the actuator and the sensor represented in the frequency domain, and $E(s)$ is the output tracking and focus error signal represented in the frequency domain.

35. The recording and/or reproducing apparatus of claim 25, wherein the disturbance correction unit comprises a processor programmed with instructions to filter the corrected control signal supplied to the actuator at a predetermined bandwidth to remove the periodic disturbance so as to produce the correction signal.

36. The recording and/or reproducing apparatus of claim 25, wherein the disturbance correction unit comprises a processor programmed with instructions to remove the periodic disturbance so as to produce the correction signal without utilizing a memory which stores a historical record of previous control signals and previous correction signals.

37. A computer readable medium encoded with processing instructions for implementing a method of excluding a disturbance occurring when operating a recording medium drive system performed by a processor in the recording medium drive system, the method comprising:

detecting an error between a position of an actuator and reference upper, lower, right and left positions of a recording medium when the recording medium drive system is operated;

receiving the detected error and outputting a next first compensation signal that the actuator uses to actuate the pickup along the recording medium in upper and lower directions, and right and left directions;

filtering a combination of a previous first compensation signal and a previous second compensation signal with a predetermined bandwidth, and outputting a next second compensation signal from which a disturbance, which is in the previous combined first and second compensation signals, has been removed; and changing a position of the actuator according to a combination of the output next first compensation signal and the output next second compensation signal.

38. The computer readable medium of claim 37, wherein the method further comprises reading predetermined available data and checking whether the recording medium drive system operates normally prior to the detecting the error and, if the recording medium drive operates normally, performing the detecting the error.

39. The computer readable medium of claim 37, wherein the method further comprises:

compensating for the detected error based on a modeling error of the actuator;

combining the compensated error and the previous first and second compensation signals to be filtered during the filtering the combination of the previous first and second compensation signals with the predetermined bandwidth, and the outputting the next second compensation signal from which the disturbance has been removed; and switching to selectively allow an output of the next second compensation signal according to a type of the detected error.

40. The computer readable medium of claim 39, wherein the bandwidth of the filtering the combination of the previous first and second compensation signals depends on a playback speed of the recording medium drive system.

41. The computer readable medium of claim 39, wherein the switching the output comprises switching such that the next second compensation signal is not output while the recording medium drive system performs jumping to or searching for a certain track if the detected error is between the reference right and left positions of the actuator and the recording medium.

42. The computer readable medium of claim 39, wherein the switching the output comprises switching such that the next second compensation signal is output while the recording medium drive system performs jumping to or searching for a certain track if the detected error is between the reference upper and lower positions of the actuator and the recording medium.

43. The apparatus of claim 1, wherein the second compensation means includes a first junction at which the next first compensation signal and the next second compensation signal are combined to form the combination compensation signal to be used by the actuator, and a second junction disposed between the first junction and the actuator at which the second compensation means detects the previous first and second compensation signals used to output the next second compensation signal.

44. The recording and/or reproducing apparatus of claim 25, further comprising:
- a first junction at which the correction signal and the control signal are combined to form the corrected control signal to be used by the actuator; and
- a second junction disposed in the feed back loop between the first junction and the actuator at which the disturbance correction unit detects the corrected control signal used to output the correction signal.

* * * * *

UNITED STATES PATENT AND TRADEMARK OFFICE
CERTIFICATE OF CORRECTION

PATENT NO. : 7,116,607 B2
APPLICATION NO. : 10/232826
DATED : October 3, 2006
INVENTOR(S) : Moon-noh Lee et al.

It is certified that error appears in the above-identified patent and that said Letters Patent is hereby corrected as shown below:

Col. 12, line 42, change "bandwith" to --bandwidth--

Col. 14, line 7, after "claim 19" insert --,--

Signed and Sealed this

Sixth Day of February, 2007

JON W. DUDAS
*Director of the United States Patent and Trademark Office*